United States Patent
Block et al.

(10) Patent No.: US 7,801,202 B2
(45) Date of Patent: Sep. 21, 2010

(54) SYNCHRONIZATION

(75) Inventors: Thomas Block, Wuppertal (DE);
Christian Zechlin, Herne (DE);
Dietmar Schnepp, Herne (DE)

(73) Assignee: Nokia Corporation, Espoo (FI)

( * ) Notice: Subject to any disclaimer, the term of this patent is extended or adjusted under 35 U.S.C. 154(b) by 1320 days.

(21) Appl. No.: 10/496,529

(22) PCT Filed: Nov. 13, 2002

(86) PCT No.: PCT/IB02/04754

§ 371 (c)(1),
(2), (4) Date: Jan. 24, 2005

(87) PCT Pub. No.: WO03/052999

PCT Pub. Date: Jun. 26, 2003

(65) Prior Publication Data

US 2005/0116834 A1    Jun. 2, 2005

(30) Foreign Application Priority Data

Dec. 18, 2001    (GB) .................................. 0130208.2

(51) Int. Cl.
*H04B 1/38* (2006.01)

(52) U.S. Cl. .................. 375/219; 375/354; 375/358

(58) Field of Classification Search .................. 375/354,
375/326, 148, 219, 220, 368, 267, 356, 358,
375/347; 370/514, 347, 507, 512, 503, 350;
323/244; 369/47.2; 455/132, 504

See application file for complete search history.

(56) References Cited

U.S. PATENT DOCUMENTS

| 5,229,996 | A | * | 7/1993 | Backstrom et al. .......... 370/507 |
| 5,261,118 | A | * | 11/1993 | Vanderspool et al. ........ 455/503 |
| 5,373,224 | A | * | 12/1994 | Rabier et al. ................ 323/244 |
| 5,416,760 | A | * | 5/1995 | Masood et al. ............. 369/47.2 |
| 5,604,745 | A | * | 2/1997 | Hijii ........................... 370/347 |
| 5,668,813 | A | * | 9/1997 | Malek et al. ................ 370/514 |
| 5,677,935 | A | * | 10/1997 | Karino ........................ 375/368 |
| 5,920,278 | A | * | 7/1999 | Tyler et al. .................... 342/33 |
| 5,999,580 | A | * | 12/1999 | Sakoda et al. ............... 375/354 |
| 6,275,544 | B1 | * | 8/2001 | Aiello et al. ................ 375/326 |
| 6,628,732 | B1 | * | 9/2003 | Takaki ........................ 375/345 |
| 6,690,657 | B1 | * | 2/2004 | Lau et al. .................... 370/315 |
| 6,959,013 | B1 | * | 10/2005 | Muller et al. ............... 370/512 |
| 7,106,784 | B2 | * | 9/2006 | Eltawil et al. ............... 375/148 |
| 2002/0053026 | A1 | * | 5/2002 | Hashimoto .................. 713/176 |
| 2005/0007251 | A1 | * | 1/2005 | Crabtree et al. ........ 340/539.13 |
| 2005/0152302 | A1 | * | 7/2005 | Takahashi et al. ........... 370/321 |

FOREIGN PATENT DOCUMENTS

WO   WO-01/18997 A1 *  3/2001
WO   WO-01/18997 A1 *  3/2001

* cited by examiner

*Primary Examiner*—Emmanuel Bayard
(74) *Attorney, Agent, or Firm*—Harrington & Smith

(57) ABSTRACT

A slave low power radio frequency transceiver participates in a network controlled by a master low power radio frequency transceiver and synchronises its timing to the network timing by receiving radio packets transmitted from the controlling low power radio frequency transceiver. The slave transceiver comprises timing means; detection means operable over an interval of time for detecting a predetermined portion of a received radio packet; and adjusting means for adjusting the timing means in response to the detection of a predetermined portion of a received radio packet. The slave low power radio frequency transceiver is arranged to controllably vary the duration of the interval of time.

34 Claims, 3 Drawing Sheets

SYNCHRONIZATION

FIELD OF THE INVENTION

The present invention relates to the synchronization of a receiving transceiver to a transmitting transceiver. Particular embodiments of the invention relate to synchronization in a Bluetooth (trademark) piconet.

BACKGROUND OF THE INVENTION

In a communication network comprising a plurality of transceivers it may be necessary to keep the transceivers synchronized so that they use the same timing for communications. One transceiver may act as a master that defines the timing for the communication system. The other transceivers act as slaves and keep synchronized with the timing of the master. One such network is a Bluetooth (trademark) piconet as described in the Specification of the Bluetooth System v1.1, Part B (Baseband).

One way of maintaining synchronization within the network is for the master to transmit periodically radio packets. In the Bluetooth system the master transmits radio packet messages with an Access Code in the preamble of a packet header. This Access Code is detected by a slave receiver. The reception of a message sent from the master allows the slave to compare its timing with that of the master and to adjust its timing to maintain synchronization. This may be done by adding an offset value to the value of the native clock in the slave.

The Bluetooth Specification, revision 1.1 requires "The slave shall be able to receive the packets and adjust RX timing as long as the timing mismatch remains within the +/−10 μs uncertainty window".

Consequently, in current implementations the slaves listen for a message in a listening window of fixed duration (20 μs) centred at the time a message is expected to be received. This means that if a master is transmitting more than 10 μs earlier or more than 10 μs later than the slave is expecting, the slave will not be able to receive the packet and will not be able to adjust its timing. Since both master and slave are using different native clocks that are allowed to drift around ±20 ppm, the slave may lose connection when it has not received a packet from the master within a time $t_{conloss}$ where:

$$t_{conloss} = \frac{10*10^{-6}s}{(20+20)*10^{-6}} = 250 \text{ ms}$$

Therefore if the master has not polled the slave for more than 250 ms or the environment is disturbed for that time, in the worst case, the connection will be lost.

During a normal, undisturbed active connection between master and slave, this time is never reached since the master has to poll the slave within $T_{Poll}$, that is 25 ms by default. However, if the master performs an Inquiry or Page, this continuous polling is interrupted for the time it takes to complete the Inquiry or Page, which is typically 5-10 s. As a consequence, it is very likely that all slaves that are connected to a piconet, will lose connection as soon as the master performs an Inquiry or Page.

One solution to this problem would be to increase the size of the fixed uncertainty window. This is unattractive because it is not required by the Bluetooth Specification and because it would result in a significant and permanent increase in power consumption by the receiver.

Another solution to the problem is provided in the Bluetooth Specification. It allows the master to force its slaves into a Hold mode for the page/inquiry time to prevent loss of synchronization. However, it is not mandatory for transceivers to support the Hold mode. In addition, the master has to separately force each slave to the Hold mode, which wastes air capacity.

The same problem of loss of synchronization can occur if the normal connection between the master and slave is disturbed. This may result from interference or multipath propagation causing degradation of the message such that it is not received in the listening window of the receiver. The use of Hold mode is not a solution to this problem.

It would be desirable to improve synchronization within a communications network.

SUMMARY OF THE INVENTION

According to one aspect of the present invention there is provided a low power radio frequency transceiver, operable to participate a network controlled by another low power radio frequency transceiver and to synchronise its timing to the network timing by receiving radio packets transmitted from the controlling low power radio frequency transceiver, comprising: timing means; detection means operable over an interval of time for detecting a predetermined portion of a received radio packet; and adjusting means for adjusting the timing means in response to the detection of a predetermined portion of a received radio packet, wherein the low power radio frequency transceiver is arranged to controllably vary the duration of the interval of time.

According to another aspect of the present invention there is provided a method of synchronising a first timing means of a first low power radio frequency transceiver, participating in a network controlled by a second low power radio frequency transceiver comprising a second timing means, to the second timing means, comprising the steps of: a) in the first transceiver, receiving data and performing a correlation over an interval to detect a predetermined data sequence in received data; and b) controlling the duration of the interval in dependence upon the time since the last detection of the predetermined sequence.

According to a further aspect of the present invention, there is provided a network comprising a first low power radio frequency transceiver comprising a first timing means synchronized to a second low power radio frequency transceiver comprising a second timing means, wherein the first transceiver is arranged to perform a correlation of controllable duration to synchronize its timing means to the timing means of the second transceiver.

According to another aspect of the present invention there is provided a method of joining an additional transceiver to a network of transceivers, wherein the network of transceivers comprises a Master and at least one Slave which synchronizes to the Master by performing a correlation to detect a predefined sequence transmitted by the Master, comprising the step of: extending the period of correlation while the Master joins a new transceiver to the network.

According to a further aspect of the present invention there is provided a receiver, for synchronising its timing to a transmitter by receiving radio packets therefrom, comprising: timing means; and detection means for detecting a predetermined portion of a received radio packet and for adjusting the timing means in response thereto, wherein the detection means is operable over an interval of time that is variable in dependence upon the time since the last detection of a predetermined portion.

The timing means of the receiving low power radio frequency transceiver may by provided by an offset (e.g. M_OFFSET) to its native clock.

Embodiments of the invention dynamically increase the synchronization window during an active connection state as long as no valid packet from the master has been received. The term "synchronization window" denotes a variable (non-fixed) window used for synchronization which is therefore different from the static (fixed) uncertainty window of the prior art.

Embodiments of the invention, may maintain synchronization when the master makes a page/inquiry without entering the Hold mode and maintain synchronization when the environment has disturbances. This is achievable without significantly and permanently increasing the power consumption of the receiving transceiver. For embodiments of the invention, the connection in the active state is extremely tolerant if the environment is disturbed.

BRIEF DESCRIPTION OF THE DRAWINGS

For a better understanding of the present invention and to understand how the same may be carried into effect reference will now be made to the accompanying drawings in which.

DETAILED DESCRIPTION OF THE INVENTION

Figure 1:
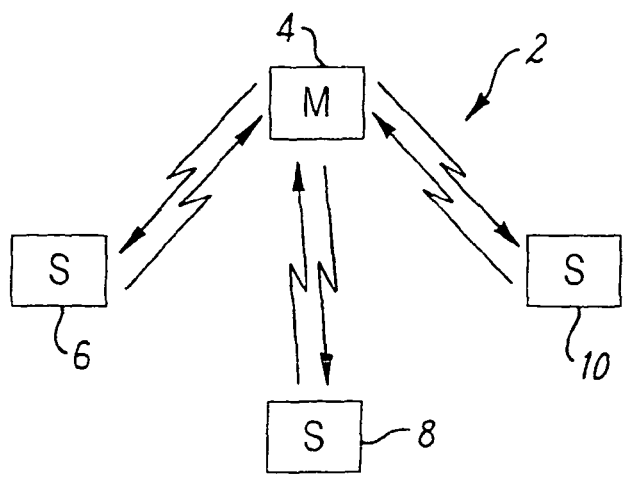
FIG. 1 illustrates a communications network including a master and slave units.

FIG. 1 illustrates a network 2 of radio transceiver units, including a master unit 4 and slave units 6, 8 and 10, communicating by transmitting and receiving radio packets. The master unit is the transceiver unit which initiates the connection of a slave to the network. There is only one master in a network. The network operates in a time division duplex fashion. The transceiver units are synchronized to a common time frame determined by the master unit 4. This time frame consists of a series of time slots of equal length (625 μs). Each radio packet transmitted in the network has its start aligned with the start of a slot and a single packet is transmitted in the network at a time. When the master unit is performing point-to-point communication a transmitted radio packet is addressed to a particular transceiver which replies to the master unit by transmitting a radio packet addressed to the master unit in the next available time slot. Any time misalignment between the master and a slave is corrected by adjusting the timing of the slave so that it is synchronized with the timing of the master. In the slave, an offset (M_OFFSET) is added to the native clock value of the slave to achieve the clock value of the master. Thus the timing of the slave and master are synchronized.

The transceivers transmit and receive, in this example, in a microwave frequency band, illustratively 2.4 GHz. The network reduces interference by changing the frequency at which each radio packet is transmitted. A number of separate frequency channels are assigned each with a bandwidth of 1 Mhz, and the frequency may hop at a rate of 1600 hops/s. The frequency hopping of the transceivers communicating in or joining the network is synchronized and controlled by the master unit. The sequence of hopping frequencies is unique for the network and is determined by a unique identification of the master unit. The position within the sequence of hopping frequencies is determined by the timing of the master i.e. the value of the native clock in the master. Each transceiver unit has a unique identification, the Unit ID, henceforth referred to as the Slave ID for the slave units and the Master ID for a master unit.

The network is a radio frequency network suitable for transmitting voice information or data information between transceivers. The transmissions made are of low power, for example 0 to 20 dBm, and the transceiver units can effectively communicate over the range of a few centimetres to a few tens or hundred of metres.

Figure 2:
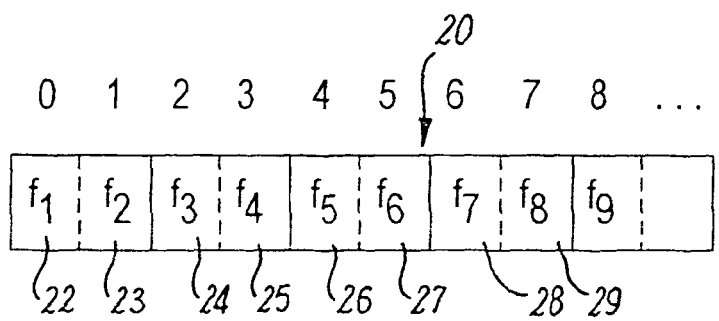
FIG. 2 illustrates the time frame of the communications network.

Referring to FIG. 2, a frame 20 is illustrated. This frame 20 is the common time frame used by the network 2 and controlled by the master unit 4. The frame illustratively has slots 22 to 29. The slots designated by even numbers are reserved. Only the master unit can begin transmitting a radio packet aligned with the start of the even numbered slots. The slots designated by odd numbers are reserved. Only radio packets transmitted by a slave, that is radio packets addressed for reception by the master unit can have their start aligned with the start of the odd numbered slots. In the communication mode, a slave can only transmit and must transmit in the slot immediately after that in which it was addressed. Each slot is allocated a different one of a sequence of hopping frequencies. A slot has a constant time period T_slot and is typically 625 microseconds.

Figure 3:
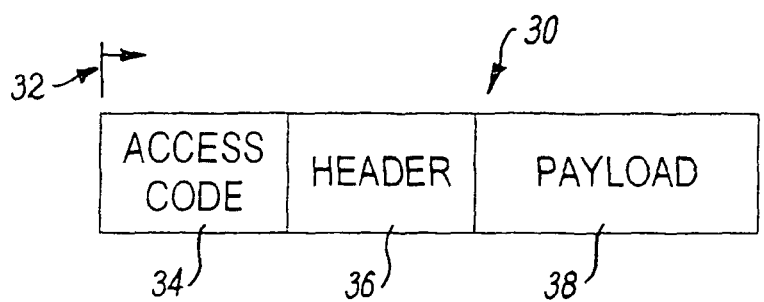
FIG. 3 illustrates a radio packet.

Referring to FIG. 3, a typical radio packet 30 is illustrated. The radio packet 30 has a start 32 and contains three distinct portions: a first preamble portion contains an Access Code 34, a second portion contains a Header 36 and a third portion contains a Payload 38.

The Access Code is a series of symbols used in the network to identify the start of a radio packet. It has a fixed length. In a normal communication mode, the master and slave units use the Master ID as the Access Code. As there is only one master unit in a network, the Master ID identifies the network.

The header 36 may or may not be present. If present, it has a fixed length. The header contains control words. The local address (AM_ADDR) is a word uniquely identifying a slave within a network. The local address is assigned to a slave unit by the master unit when the master unit joins the slave to the network.

The payload 38 carries either transceiver control information or voice/data information. The payload is of variable length and may be absent.

Figure 4:
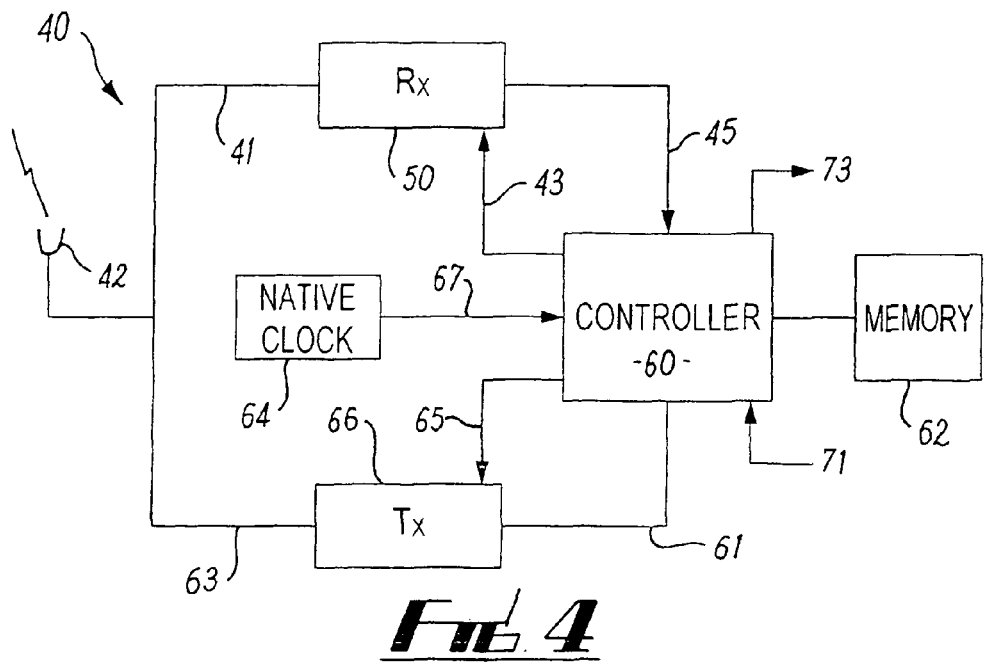
FIG. 4 illustrates a transceiver unit suitable for use as a master or slave.

Referring to FIG. 4, a schematic illustration of a transceiver unit 40 is shown. Only as many functional blocks and interconnections are shown in this diagram as are necessary to explain in the following how a transceiver unit and the communication network operates. The transceiver unit 40 contains a number of functional elements including: an antenna 42, receiver 50, controller 60, memory 62, clock 64, and transmitter 66. Although these elements are shown as separate elements they may in fact be integrated together and may be carried out in software or in hardware.

The controller 60 determines the content of the Access Code 34, the Header 36 and the payload 38 of a packet to be transmitted. The payload content may be data supplied by data signal 71 to the controller 60 or control information generated in the controller 60. The controller 60 provides the packet data to the transmitter 66 as packet data signal 61.

The transmitter 66 modulates a carrier wave in dependence upon the packet data to produce the transmitted signal 63 supplied to the antenna 42 for transmission. The controller 60 provides a transmission frequency control signal 65 to the transmitter 66, which controls the frequency of the carrier wave to be a correct one of a sequence of hop frequencies.

All packets transmitted in the communication mode in the network have an Access Code determined by the MASTER ID and a frequency determined by the master unit's frequency-hopping sequence. When the transceiver unit 40 is operating as a slave, the controller 60 emulates the clock of the master unit by combining its own native clock signal 67 and an offset value M_OFFSET stored in memory 62. M_OFFSET represents the difference between the native clocks of the master and the slave. The controller 60 reproduces the master unit's frequency-hopping sequence using a value of MASTER ID stored in memory 62 and determines the correct position within the hopping sequence from the emulated master clock value. The transmission frequency control signal 65 is then produced by controller 60 to control the transmitter 66 to transmit at the correct hop frequency, which is determined from the master unit's frequency-hopping sequence and the emulated master clock value. Thus the master and slave synchronously hop frequencies.

The antenna 42 receives a radio signal 41 and supplies it to the receiver 50 which demodulates the radio signal 41 under the control of a reception frequency control signal 43, from the controller 60. Demodulation produces a digital signal 45, which is provided to controller 60. The reception frequency control signal 43 controls the receiver to receive at the correct hop frequency, which is determined from the master unit's frequency-hopping sequence and the emulated master clock value.

In this embodiment, the controller 60 is used to detect the Access Code of a received packet. In other embodiments, this function may be performed by a separate component. The controller 60 uses the digital signal 45 to synchronize the transceiver unit 40 to the time frame of the network. The controller determines the length of the synchronization window that should be used for the correlation process. The synchronization window is symmetrically positioned to when the access code transmitted by the master is expected to be received. A sliding correlation is then used by the controller 60 for the duration of the synchronization window to detect the presence of an expected Access Code in a received radio packet.

If the presence of the expected access code is detected, the controller resynchronizes the slave's emulated version of the master clock to the native clock of the master. The controller compares the clock value at which a message was expected to be received and the clock value at which the message was received and varies the value M_OFFSET stored in memory 62 by the difference. Thus the emulated master clock is resynchronised with the native clock of the master.

The controller 60 accepts those received radio packets with Access Codes which correspond to the expected Access Codes and rejects those received radio packets with Access Codes that do not correspond to the expected Access Code. If the radio packet is accepted, then the header of the packet is decoded. If the packet is addressed to the slave then the payload is obtained. The content of the payload may be provided to other circuitry (not shown) as output signal 73 by controller 60.

Figure 5:
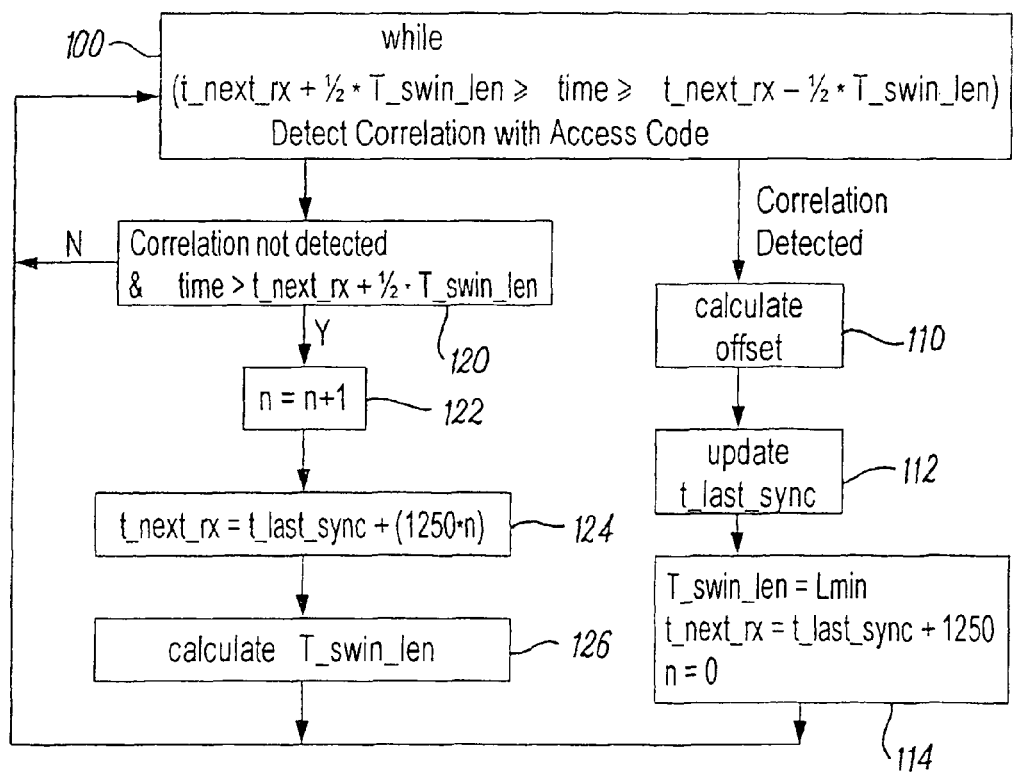
FIG. 5 illustrates a process flow occurring in a slave according to one embodiment of the invention.

FIG. 5 illustrates a process flow occurring in a slave according to one embodiment of the invention. For an understanding of this embodiment the following terms are defined:

T_swin_len is the length in microseconds of the synchronization window.

t_next_rx is when the access code of the next packet to be received is expected.

L_min is the minimum length of T_swin_len.

L_max is the maximum length of T_swin_len.

t_last_sync is the time at which synchronization between the slave and master last occurred.

n represents the number of Access Codes the detection of which has been missed.

Drift_slave and Drift_master are respectively the maximum drift in the slave native clock and the maximum drift in the master native clock. In active mode, each has a maximum drift of +/−20 ppm. This is fixed and a requirement of the Bluetooth Specification.

The slaves in active connection mode normally try and receive every 2 slots (1.25 ms), so t_next_rx is normally 1250 µs after the last Access Code was received. However, this may be interrupted for example if the slave transceiver conducts an inquiry scan for a different piconet (different master) or if the slave fails to receive an expected packet. It is to be expected, however, that the next Access Code will be received at some multiple of 1.25 ms after the last Access Code was received.

At step 100, the controller 60 performs a correlation for the duration of the synchronization window or the detection of the Access Code, if sooner. The duration of the correlation is T_swin_len and the correlation window is centred on the expected time of arrival of the next Access Code (t_next_rx). Thus the correlation begins at t_next_rx−½×T_swin_len and continues until t_next_rx+½×T_swin_len.

If the Access Code is detected at step 100, the process moves through steps 110, 112 and 114 before returning to step 100.

At step 110, the controller calculates the new value for M_OFFSET thereby bringing the slave's emulation of the master clock into synchronization with the master's native clock. The new value of M_OFFSET is equal to the old value plus the difference between the expected time of detection of the Access Code and the actual time the Access Code was detected in step 100.

At step 112, the value of t_last_sync is updated. It is made equal to the master clock time at which the Access Code was detected in step 100. This is therefore the last time synchronization occurred with the master.

At step 114, T_swin_len is set to the minimum value L_min and T_next_rx, which is the time at which the detection of the next Access Code is expected is made equal to the master clock time at which the Access Code was detected at step 100 (t_last_sync) plus the duration of a frame (1.25 ms). The variable n is set to 0.

If the Access Code is not detected at step 100, the process moves through steps 120, 122, 124 and 126 before returning to step 100.

At step 120, it is checked that the synchronization window has finished and that the Access Code has not been detected. If this is the case the process proceeds to step 122. If the synchronization window has not finished, correlation continues at step 100.

At step 122, the counter n is incremented one, as the detection of an Access Code has been missed. The process proceeds to step 124.

At step 124, the expected time (t_next_rx) at which the next Access Code will be detected is increased by the duration of a frame (1.25 ms) from the last value of t_next_rx. This may be achieved by setting t_next_rx equal to t_last_sync plus, the Bluetooth period 1.25 ms multiplied by the number of missed detections n. The process then proceeds to step 126.

At step 126, the duration of the next synchronization window (T_swin_len) is calculated. Once calculated the process returns to step 100, where the new values for the expected time of detection of the next Access Code and the length of the synchronization window are used.

Figure 6:
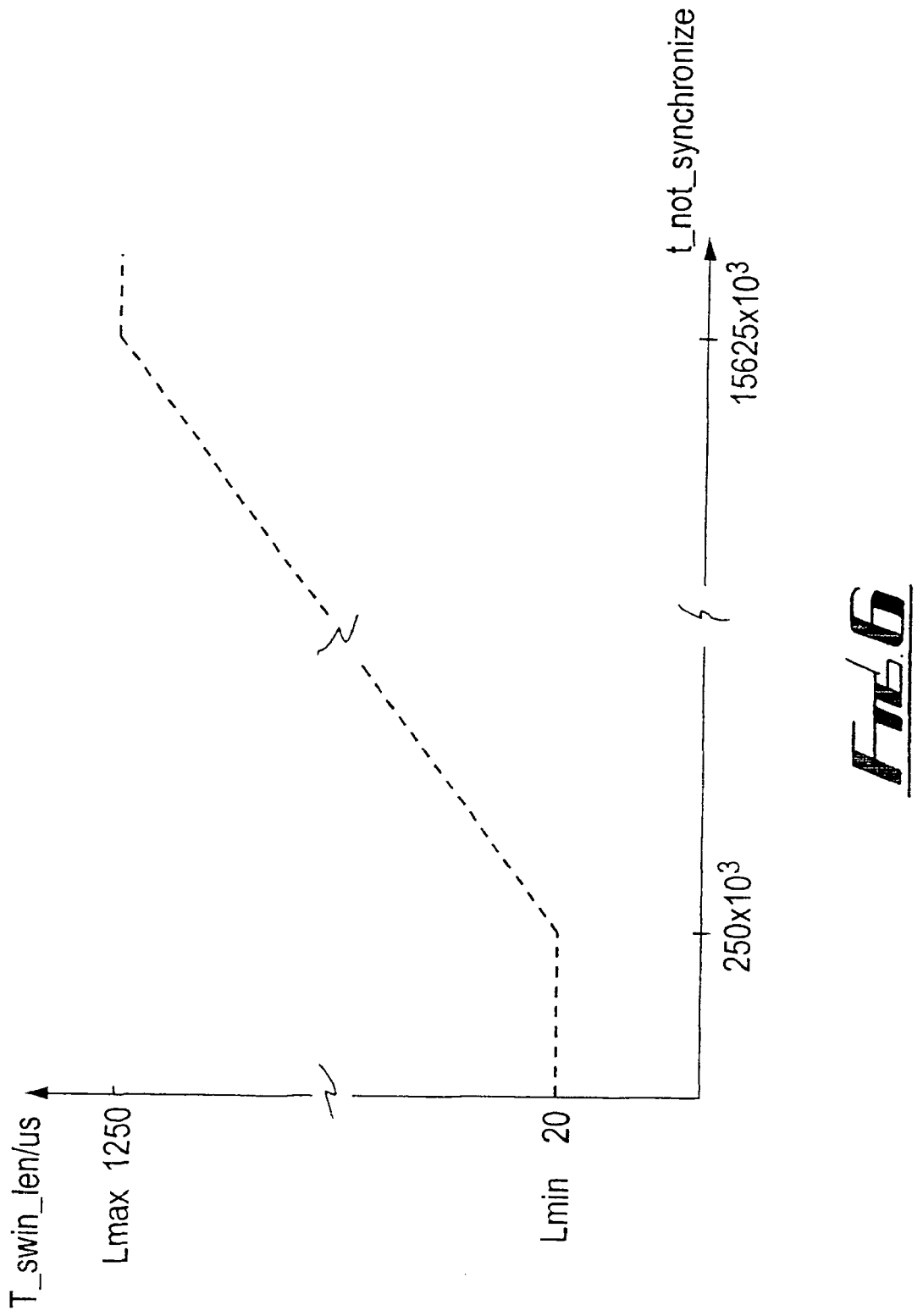
FIG. 6 illustrates the variation of the length (T_swin_len) of the synchronization window with the time (t_not_synchronized) since the last synchronization.

The variation of the length (T_swin_len) of the synchronization window with the time (t_not_synchronized) since the last synchronization is illustrated in FIG. 6. The time since the last synchronization is the duration between the time at which the last Access Code was detected (t_last_sync) and the time at which the next detection of an Access Code is expected (t_next_rx) i.e. t_not_synchronized=(t_next_rx−t_last_sync). The length of the synchronization window is plotted in microseconds. The time since the last synchronization is plotted in microseconds.

The value of T_swin_len remains constant at L_min (20 μs) until over 250 ms have elapsed since the last successful synchronization. Thus during this period the size of the synchronization window is the same as the fixed uncertainty window of the prior art.

The value of T_swin_len then increases at a constant rate of, for example, $80 \times 10^{-6}$ until 15625 ms have elapsed since the last successful synchronization and T_swin_len has increased to 1.25 ms. The gradient of the graph is given by the sum of Drift_master and Drift_slave. Thus T_swin_len= (Drift_master+Drift_slave)*t_not_synchronized.

The value of T_swin_len then remains constant at L_max (1.25 ms) as the time since the last successful synchronization (t_not_synchronized) increases. L_max equals the Bluetooth frame (2 slots) as it should be possible to hear at every master TX slot. However, the value of L_max depends on the implementation. In a hardware implementation, 1.25 ms is best. But if a software implementation is used, for example, the preparation to receive again can consume time, so this preparation time must be subtracted from 1.25 ms.

The process of calculating the length of the synchronization window may proceed as follows.

a) T_swin_len is set equal to (Drift_master+Drift_slave)× t_not_synchronized.
b) T_swin_len is then set equal to the greater of T_swin_len calculated at a) and L_min.
c) T_swin_len is then set equal to the lesser of T_swin_len calculated at b) and L_max.

The value of T_swin_len determined at c) is then used for step 100 in FIG. 5.

Embodiments of the invention may be implemented by updating the software of existing transceivers.

Although embodiments of the invention have been described in the preceding paragraphs with reference to various examples, it should be appreciated that modifications to the examples given can be made without departing from the scope of the invention.

Whilst endeavouring in the foregoing specification to draw attention to those features of the invention believed to be of particular importance it should be understood that the Applicant claims protection in respect of any patentable feature or combination of features hereinbefore referred to and/or shown in the drawings whether or not particular emphasis has been placed thereon.

The invention claimed is:

1. A receiver comprising:
   a detection component configured to operate over an interval of time for detecting a predetermined portion of a received radio packet from a controlling low power radio frequency transceiver, the receiver being configured to participate in a network controlled by the low power radio frequency transceiver and to synchronize the receiver timing to the network timing by receiving radio packets; and
   an adjusting component configured to adjust a timing component in response to the detection of a predetermined portion of a received radio packet, wherein the receiver is configured to controllably increase the duration of the interval of time in response to the detection component detecting that a predetermined portion of a radio packet has not been received.

2. A receiver as claimed in claim 1, wherein the interval of time is dependent upon the time since a last synchronization.

3. A receiver as claimed in claim 1, wherein the interval of time is dependent upon the time that has elapsed since the last detection of a predetermined portion of a received packet.

4. A receiver as claimed in claim 1, wherein the interval of time is dependent upon the time between the last detection of a predetermined portion of a received packet and an expected time of arrival of a packet transmitted from the controlling low power radio frequency transceiver.

5. A receiver as claimed in claim 1, wherein the interval of time is a synchronization window centered at an expected time of arrival of the packet.

6. A receiver as claimed in claim 1, wherein the interval of time is a synchronization window over which a correlation is performed to detect the predetermined portion of a received radio packet.

7. A receiver as claimed in claim 1, wherein the interval of time has a minimum duration.

8. A receiver as claimed in claim 7, wherein the minimum duration is 20 μS.

9. A receiver as claimed in claim 1, wherein the interval of time has a maximum duration.

10. A receiver as claimed in claim 9, wherein the maximum duration is 1250 μS.

11. A receiver as claimed in claim 1, further comprising a determination component configured to determine the duration of the interval of time.

12. A receiver as claimed in claim 11, wherein the determination of the duration of the interval of time for an expected radio packet is completed before an expected time of arrival of that radio packet.

13. A receiver as claimed in claim 11, wherein the determination component is configured to determine a minimum duration for the interval of time until an expected time of arrival of a radio packet exceeds a threshold.

14. A receiver as claimed in claim 11, wherein the determination component is configured to determine a duration for the interval of time that increases at a constant rate with an expected time of arrival of a radio packet.

15. A receiver as claimed in claim 11, wherein the determination component is configured to determine the interval of time by multiplying the duration between the time of arrival of the last received packet and an expected time of arrival of the next packet to be received, by a factor representing the the relative drift between the timing component and the network timing.

16. A receiver as claimed in claim 15, further comprising a clock having a first maximum clock drift, for synchronization with another clock, in the controlling transceiver, having a second maximum clock drift wherein the factor is the sum of first and second maximum clock drifts.

17. A receiver as claimed in claim 1, further comprising a clock, wherein the adjusting of the timing component involves adding an offset derived from an expected time of detection and the actual time of detection to the clock.

18. A receiver as claimed in claim 1, wherein the detection component is configured to detect an access code at the beginning of a packet.

19. A receiver as claimed in claim 1, operable as a slave or a master in a piconet.

20. A receiver as claimed in claim 1, further comprising a timing component.

21. A receiver comprising:
   a timing component;
   a detection component configured to operate over an interval of time for detecting a predetermined portion of a received radio packet from a controlling low power radio frequency transceiver, the receiver being configured to participate in a network controlled by the low power radio frequency transceiver and to synchronize the receiver timing to the network timing by receiving radio packets; and
   an adjusting component configured to adjust the timing component in response to the detection of a predetermined portion of a received radio packet, wherein the receiver is configured to controllably increase the duration of the interval of time in response to the detection component detecting that a predetermined portion of a radio packet has not been received;
   wherein the interval of time is calculated according to a value that increases, between a minimum value and a maximum value, at a constant rate.

22. A receiver as claimed in claim 21, wherein the constant rate is 80 μS/second.

23. A network comprising a first receiver, configured to participate in a network controlled by a low power radio frequency transceiver and to synchronize the first receiver timing to the network timing by receiving radio packets transmitted from the controlling low power radio frequency transceiver, comprising: a timing component; a detection component configured to operate over an interval of time for detecting a predetermined portion of a received radio packet; and an adjusting component configured to adjust the timing component in response to the detection of a predetermined portion of a received radio packet, wherein the receiver is configured to controllably increase a duration of the interval of time in response to the detection component detecting that a predetermined portion of a radio packet has not been received, operating as a slave and a controlling low power radio frequency transceiver operating as a master wherein the master is configured to join an additional receiver to the network as a slave without holding an operation of the first receiver.

24. A method comprising:
   in a receiver comprising a first timing component, receiving data from a low power radio frequency transceiver comprising a second timing component for synchronizing the first timing component to the second timing component, the receiver participating in a network controlled by the low power radio frequency transceiver, and performing a correlation over an interval to detect a predetermined data sequence in received data; and
   increasing a duration of the interval in response to detecting that a predetermined data sequence has not been received.

25. A method as claimed in claim 24, wherein the interval of time is a synchronization window centered at an expected time of arrival of a packet.

26. A method as claimed in class 24, wherein the interval of time is a synchronization window over which a correlation is performed to detect the predetermined portion of a received radio packet.

27. A method as claimed in claim 24, further comprising calculating the interval of time according to a value that increases, between a minimum value and a maximum value, at a constant rate.

28. A method as claimed in claim 24, further comprising determining the duration of the interval of time at a determination means.

29. A method as claimed in claim 28, wherein the determination of the duration of the interval of time for an expected radio packet is completed before an expected time of arrival of that radio packet.

30. A method as claimed in claim 24, further comprising adjusting the first timing component by adding an offset derived from an expected time of detection and the actual time of detection to a clock of the first low power radio frequency transceiver.

31. A network comprising a receiver comprising a first timing means synchronized to a low power radio frequency transceiver comprising a second timing means, wherein the receiver is configured to perform a correlation over an interval of time to detect a predetermined data sequence in data received from the transceiver and to synchronize the first timing means to the timing means of the transceiver, wherein the interval of time is extendable in response to the receiver detecting that a predetermined data sequence has not been received.

32. A method of joining an additional transceiver to a network of transceivers, wherein the network of transceivers comprises a master and at least one slave which synchronizes to the master by performing a correlation to detect a pre-defined sequence transmitted by the master, comprising:
   extending a period of correlation while the master joins a new transceiver to the network, in response to the slave detecting that a pre-defined sequence has not been received.

33. A method as claimed in claim 32, further comprising calculating the period of correlation according to a value that increases, between a minimum value and a maximum value, at a constant rate.

34. A receiver, for synchronizing the receiver timing to a transmitter by receiving radio packets therefrom, comprising:
   timing means; and
   detection means for detecting a predetermined portion of a received radio packet and for adjusting the timing means in response thereto, wherein the detection means is operable over an interval of time that is extendable in response to the detection means detecting that a predetermined portion of a radio packet has not been received.

\* \* \* \* \*

UNITED STATES PATENT AND TRADEMARK OFFICE
CERTIFICATE OF CORRECTION

PATENT NO. : 7,801,202 B2  
APPLICATION NO. : 10/496529  
DATED : September 21, 2010  
INVENTOR(S) : Block et al.

Page 1 of 1

It is certified that error appears in the above-identified patent and that said Letters Patent is hereby corrected as shown below:

Claim 15, col. 8, line 56 delete "the" in between the and relative.

Signed and Sealed this

Thirtieth Day of November, 2010

David J. Kappos  
*Director of the United States Patent and Trademark Office*